United States Patent
Andree et al.

(10) Patent No.: US 12,323,007 B2
(45) Date of Patent: Jun. 3, 2025

(54) ELECTRIC MOTOR AND METHOD FOR OPERATING AN ELECTRIC MOTOR

(71) Applicant: GKN Powder Metallurgy Engineering GmbH, Bonn (DE)

(72) Inventors: Maurice Andree, Neukirchen-Vluyn (DE); Stefan Tiller, Sankt Augustin (DE); Hong Giang To, Düsseldorf (DE)

(73) Assignee: GKN Powder Metallurgy Engineering GmbH, Bonn (DE)

( * ) Notice: Subject to any disclaimer, the term of this patent is extended or adjusted under 35 U.S.C. 154(b) by 157 days.

(21) Appl. No.: 18/009,438

(22) PCT Filed: Jun. 9, 2021

(86) PCT No.: PCT/EP2021/065492
§ 371 (c)(1),
(2) Date: Dec. 9, 2022

(87) PCT Pub. No.: WO2021/250108
PCT Pub. Date: Dec. 16, 2021

(65) Prior Publication Data
US 2023/0223828 A1  Jul. 13, 2023

(30) Foreign Application Priority Data
Jun. 9, 2020 (DE) .................. 10 2020 115 263.9

(51) Int. Cl.
*H02K 1/2795* (2022.01)
*H02K 9/06* (2006.01)
*H02K 16/02* (2006.01)

(52) U.S. Cl.
CPC ............. *H02K 1/2795* (2022.01); *H02K 9/06* (2013.01); *H02K 16/02* (2013.01)

(58) Field of Classification Search
CPC ........ H02K 1/2795; H02K 9/06; H02K 16/02; H02K 21/12
See application file for complete search history.

(56) References Cited

U.S. PATENT DOCUMENTS

| 6,617,747 B1 | 9/2003 | Petersen |
| 7,345,390 B2 | 3/2008 | Schüler et al. |

(Continued)

FOREIGN PATENT DOCUMENTS

| DE | 202019106915 U1 | 2/2020 |
| EP | 2190108 A1 | 5/2010 |

(Continued)

OTHER PUBLICATIONS

English translation of JP-2008-245504-A (Year: 2008).*

(Continued)

*Primary Examiner* — Tulsidas C Patel
*Assistant Examiner* — Joshua Kiel M Rodriguez
(74) *Attorney, Agent, or Firm* — Quarles & Brady LLP

(57) ABSTRACT

An electric motor, comprising at least a stator, which extends between a first end face and a second end face along an axial direction and has an annular yoke on the first end face and starting from the yoke a plurality of cores, which each extend along the axial direction over a first length to the second end face and are arranged adjacent to one another along a circumferential direction, wherein a coil is arranged on each core, which coil extends starting from the yoke along the axial direction over a second length toward the second end face. The second length is shorter than the first length, so that a portion of each core extends along the axial direction beyond the coil concerned. The motor additionally comprises at least one first rotor which is arranged, at least on the second end face along the axial direction between the coils and the second end face.

8 Claims, 3 Drawing Sheets

(56) References Cited

U.S. PATENT DOCUMENTS

Figure 1:
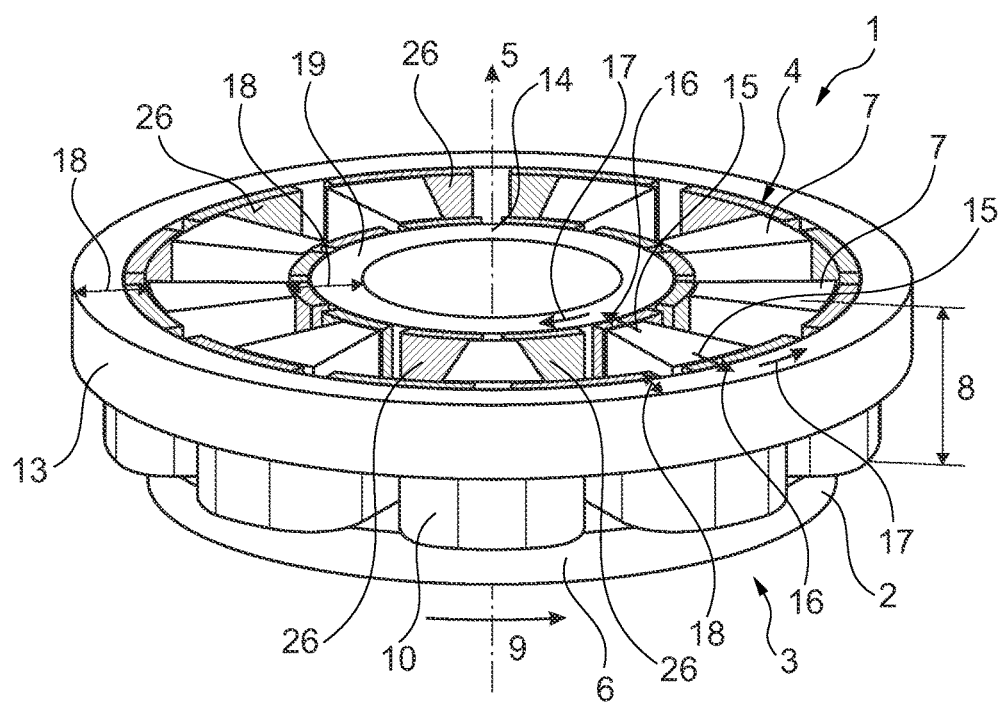

| | | |
|---|---|---|
| 10,707,734 B2 | 7/2020 | Holenstein et al. |
| 11,424,653 B2 | 8/2022 | Chang |
| 2005/0179337 A1 | 8/2005 | Hasebe et al. |
| 2009/0224628 A1 | 9/2009 | Hiwaki et al. |
| 2011/0234037 A1 | 9/2011 | Petro et al. |
| 2017/0179800 A1 | 6/2017 | Coldwate et al. |

FOREIGN PATENT DOCUMENTS

| | | |
|---|---|---|
| EP | 3232549 A1 | 10/2017 |
| JP | S55173276 U | 12/1980 |
| JP | 2001037133 A | 2/2001 |
| JP | 2002233120 A | 8/2002 |
| JP | 2005532026 A | 10/2005 |
| JP | 2008245504 A | 10/2008 |
| WO | 2005100080 A1 | 10/2005 |
| WO | 2007010640 A1 | 1/2007 |
| WO | 2016066714 A2 | 5/2016 |

OTHER PUBLICATIONS

English translation of JP-2001-037133-A (Year: 2001).*
Japanese Patent Office, Notice of Reasons for Refusal and Search Report, Application No. 2022-576067, Feb. 20, 2024, 31 pages.
German Patent and Trademark Office, First Examination Report, Application No. 102020115263.9, Aug. 20, 2020, 7 pages [No English Language Translation Available].
German Patent and Trademark Office, Second Examination Report, Application No. 102020115263.9, Nov. 22, 2021, 5 pages [No English Language Translation Available].
PCT International Search Report and Written Opinion, PCT/EP2021/065492, Sep. 24, 2021, 19 pages.

* cited by examiner

ELECTRIC MOTOR AND METHOD FOR OPERATING AN ELECTRIC MOTOR

This application represents the U.S. national stage entry of International Application No. PCT/EP2021/065492 filed Jun. 9, 2021, which claims priority to German Patent Application No. 10 2020 115 263.9 filed Jun. 9, 2020, the disclosure of which is incorporated herein by reference in its entirety and for all purposes.

The present invention relates to an electric motor, wherein the electric motor comprises at least one stator and one rotor.

There is a continuing need to reduce the structural size of electric motors or expand their functionality.

Against this background, the object of the present invention is to propose an electric motor which can implement these aspects. In particular, an electric motor is to be provided in which two rotors can be operated independently of each other via a single stator. With regard to this use case, an advantageous design of an electric motor is to be provided.

In order to achieve this object, an electric motor according to the features of claim 1, a first method for operating an electric motor according to claim 7, and a second method for operating an electric motor according to claim 8 are proposed. Advantageous developments are the subject of the dependent claims. The features explained individually in the claims can be combined with one another in a technically appropriate manner and can be supplemented by explanatory content from the description and details from the drawings, wherein further alternative embodiments of the invention are demonstrated.

This is achieved by an electric motor which has at least a stator which extends in an axial direction between a first front side and a second front side and has, at the first front side, an annular yoke and, starting from the yoke, a plurality of cores which each extend in the axial direction over a first length as far as the second front side and are arranged next to one another in a circumferential direction. A coil, which, starting from the yoke, extends in the axial direction over a second length to the second front side, is arranged at each core. The second length is smaller than the first length such that a section of each core extends in the axial direction beyond the respective coil. The motor additionally has at least a first rotor which is arranged at least on the second front side in the axial direction between the coils and the second front side, wherein, when the motor is operating, the first rotor uses (essentially) a first component oriented in a radial direction of the magnetic flux generated by the stator in order to drive the first rotor.

In particular, a stator which is constructed in the manner of an axial-flux motor is here combined with a first rotor which is constructed and arranged in the manner of a radial-flux motor.

In an axial-flux motor, the stator and rotor are arranged next to each other in the axial direction, wherein the rotor has poles which are arranged opposite the coils and cores in the axial direction and possibly aligned with them in the axial direction (i.e., for example, on a same diameter). The stator has cores and coils which, starting from an annular base body (yoke), extend in an axial direction. The number of coils and cores and the number of poles of the rotor can differ from each other or match each other.

In an axial-flux motor, essentially a first component, oriented in the axial direction, of the magnetic flux generated by the stator is used in order to drive the rotor.

In a radial-flux motor, the stator and rotor are arranged in the radial direction, wherein the rotor has poles which are arranged opposite the coils and cores in the radial direction and possibly aligned with them at least in the radial direction (i.e., for example, on a same section in the axial direction). At the stator, stator teeth or cores extend, starting from an annular base body (yoke), inward or outward in the radial direction.

In a radial-flux motor, essentially a first component, oriented in the radial direction, of the magnetic flux generated by the stator is used in order to drive the rotor.

The stator of the electric motor has in particular a soft magnetic material, for example a so-called "soft magnetic composite" (SMC) or a combination of electrical sheets and SMC. The cores of the stator are preferably produced by being pressed from a soft magnetic material and baked. The SMC material is not sintered here. Instead, its temperature is regulated to below a melting temperature which is, however, sufficient that the cores permanently retain their geometry.

The respective rotor has in particular permanent magnets and/or soft magnetic elements, for example, in recesses. A permanently excited synchronous or brushless direct-current motor (BLDC for short) can preferably be formed, whilst, for example, a reluctance motor can be produced as an electric motor with soft magnetic elements.

The respective rotor can alternatively be configured as a cage rotor or squirrel cage rotor, or as a slip ring rotor, wherein an asynchronous machine is then formed.

In particular, the rotor is produced at least partially by sintering. In particular, complex structures can be formed on the rotor by sintering in a very simple manner.

The structure of a stator, in particular using SMC, and further details, also relating to a rotor, can be found, for example, in WO 2016/066714 A1.

In particular, when the motor is operating, a drive force acting between the stator and the first rotor can be generated in a region of the first rotor which is arranged in the radial direction at least inside or outside the cores.

In particular, the first rotor is designed such that the region, i.e. the poles of the rotor, are arranged in the radial direction only inside or outside the cores.

Alternatively, the first rotor is designed such that two regions are provided, i.e. one inside the cores in the radial direction and one outside. In this embodiment, the two regions are coupled to each other mechanically, wherein there are the same number of poles present in the respective region. An electric motor can thus be provided by means of which, on the one hand, a high torque can be obtained and in which an only small resultant force, acting in the axial direction, is generated relative to the use of a rotor which is constructed in the manner of an axial-flux motor.

The motor preferably comprises at least the first rotor and a second rotor, wherein the region of one rotor is arranged outside the cores in the radial direction and the region of the other rotor is arranged inside the cores in the radial direction. In the motor, in particular at least two rotors can be operated independently of each other via a single stator.

Particularly advantageous operating modes, which will be explained below, result for this design with two rotors.

In particular, the motor additionally comprises a rotor component which forms a third rotor or part of the first rotor or a second rotor. The rotor component is arranged next to the stator in the axial direction. When the motor is operating, the rotor component uses a second component, oriented in the axial direction, of the magnetic flux generated by the stator in order to drive the rotor component.

In particular, this rotor component is constructed in the manner of an axial-flux motor. In an axial-flux motor, the stator and the rotor component are arranged next to each other in the axial direction, wherein the rotor component has poles which are arranged opposite the coils and cores of the stator in the axial direction and possibly aligned with them at least in the axial direction (i.e., for example, on a same diameter).

The rotor component can form an independent third rotor such that the motor has the first rotor and the third rotor or additionally the second rotor. The third rotor can also be configured so that it is mechanically coupled to the first rotor or, where present, to the second rotor. In the case of mechanical coupling, the relevant rotors or the relevant rotor and the rotor component have the same number of poles.

In particular, the motor comprises at least two rotors, wherein the rotors have a different number of poles from each other such that the rotors can be operated at least at a different speed or in a different direction of rotation. Each rotor is here driven directly by the one rotating field of the stator. A gearbox or transmission is not necessary here.

If the motor is configured as a synchronous motor, the rotating field generated by the stator must be provided in a fixed relation to the respective position of the relevant rotor. The rotating field can here be provided in particular as a compromise depending on the position of each rotor or only depending on the position of one rotor. In the latter case, the respective at least one other rotor must then follow this rotating field.

In particular, for example, one rotor can be operated via the rotating field of the stator at a speed that is twice as high as the other rotor, possibly in the opposite direction of rotation. Two known motors in which only one rotor can be operated via one stator at all times can thus be replaced by the proposed motor which has just one stator but at least two rotors.

In particular, the motor comprises at least two rotors, wherein at least one rotor has a first design for a synchronous machine and at least the other rotor has a second design for an asynchronous machine, wherein, when the motor is operating, a rotating field of the stator is oriented according to the rotor of the first design, and the rotor of the second design follows the rotating field with slip. Regulation of the rotating field can thus be simplified because the rotor of the second design passively follows the rotating field.

In particular, the motor comprises at least two rotors, wherein the rotors have different starting torques such that one rotor can be operated at one speed, whilst the other rotor is stationary. In particular, one rotor can be operated in order to regulate the temperature of the other rotor.

In particular, the motor comprises at least two rotors, wherein one rotor has a fluid-delivery geometry for delivering a fluid, wherein the delivery of the fluid is provided for regulating the temperature of the other rotor. In particular, the fluid-delivery geometry is configured in the manner of a pump such that rotation of the rotor causes movement of a fluid in a specific, in particular uniform direction.

A (first) method for operating an electric motor, in particular the motor described, is furthermore proposed. The motor has a stator and at least two rotors, wherein one rotor has a first number of poles and the other rotor has a second number of poles, wherein the rotors are operated at least at a different speed or in a different direction of rotation. In the motor, in particular at least two rotors can be operated independently of each other via a single stator.

Each rotor is here driven directly by one rotating field of the stator. A gearbox or transmission is not necessary here.

A (second) method for operating an electric motor, in particular the motor described, is proposed. The motor has a stator and at least two rotors, wherein the rotors have different starting torques such that one rotor is operated at one speed, whilst the other rotor is stationary. In the motor, in particular at least two rotors can be operated independently of each other via a single stator.

The explanations of the motor apply in particular equally for the methods described, and vice versa.

The use of indefinite articles ("a", "an") in particular in the claims and the description which reproduces these is to be understood as such and not as numerals. Terms and components introduced thereby are thus correspondingly to be under-stood such that they are present at least once and can, however, in particular also be present in a multiple.

For the avoidance of doubt, the numerals used here ("first", "second", "third", etc.) primarily serve (only) to distinguish between multiple similar objects, sizes or processes, i.e. do not prescribe any dependency and/or sequence of these objects, sizes or processes on or to one another. Should a dependency and/or sequence be required, this is explicitly stated here or is obvious to a person skilled in the art when studying the specific described embodiment.

Figure 2:
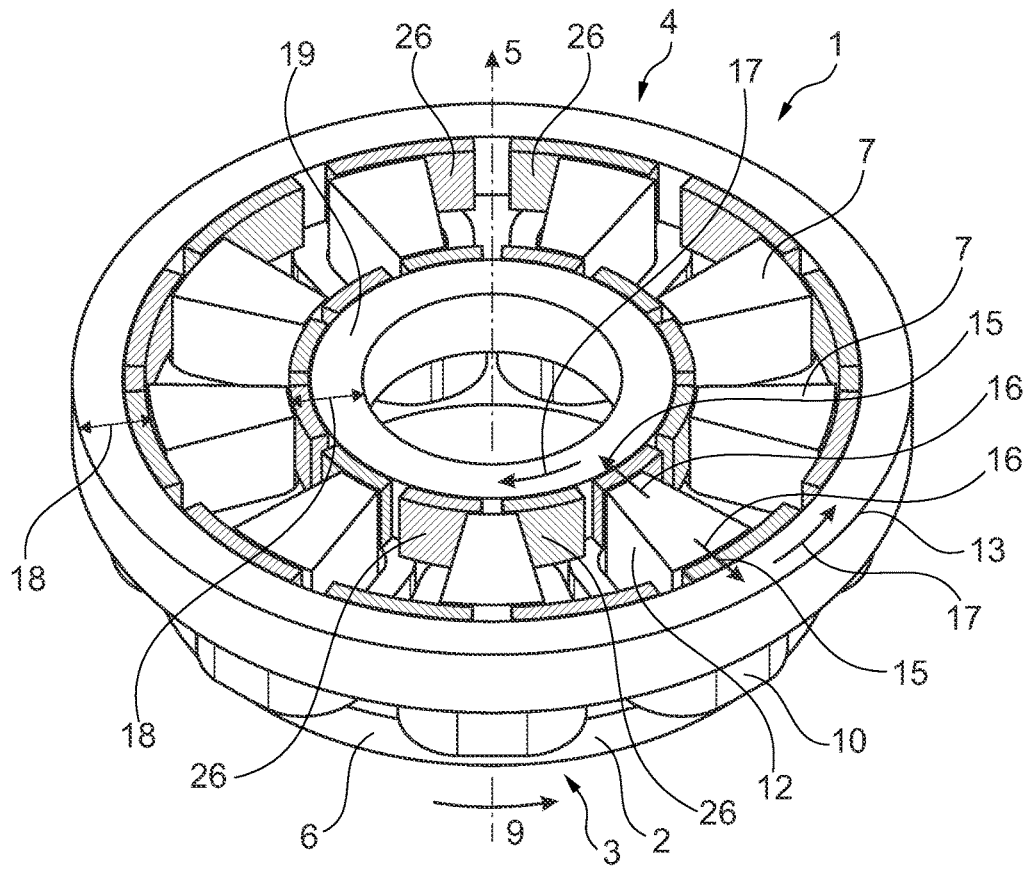
Figure 3:
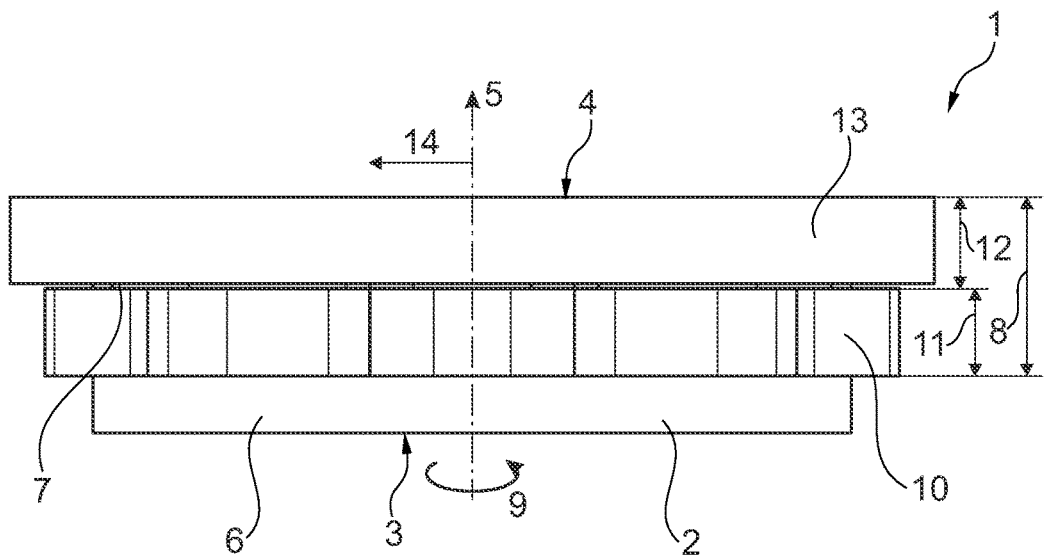
Figure 4:
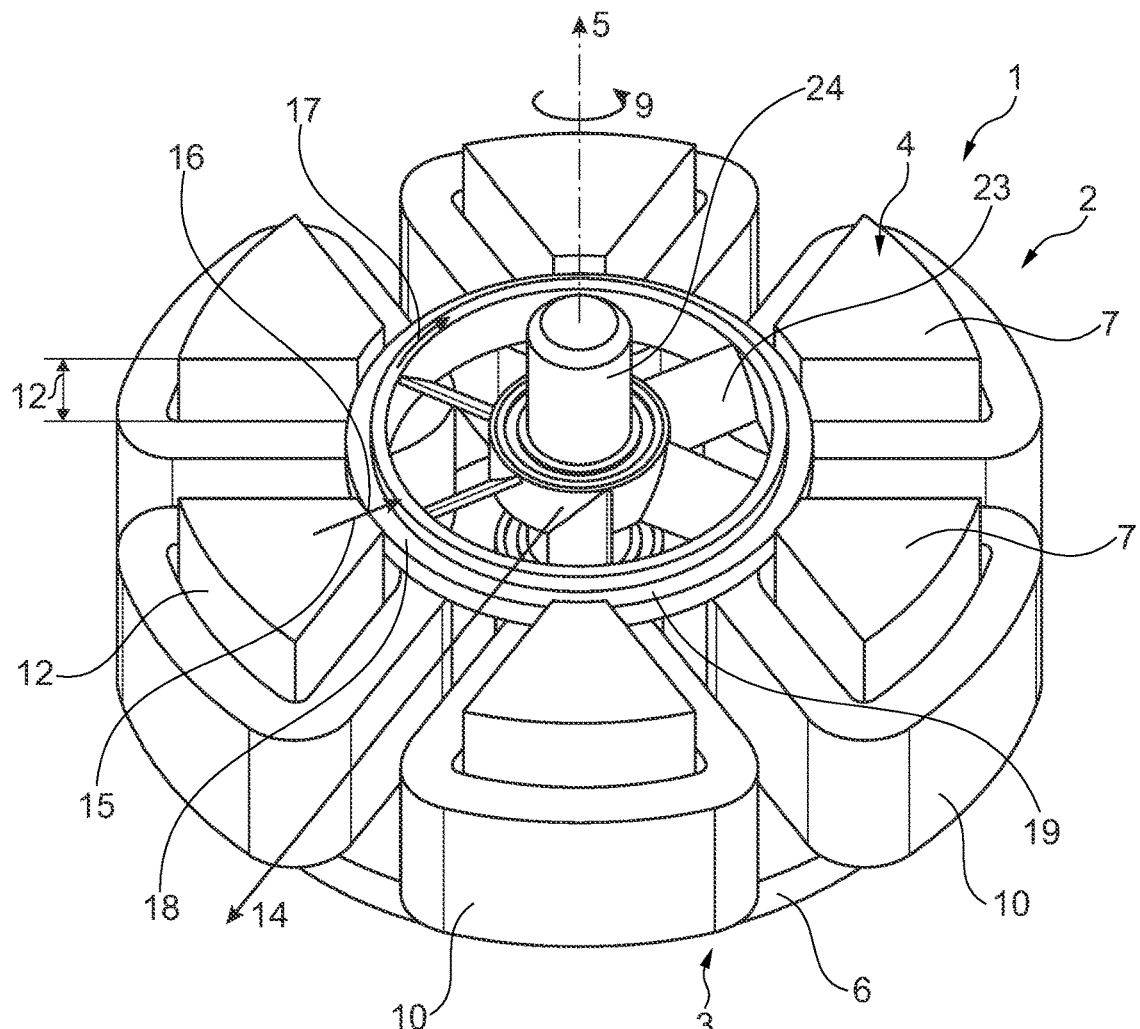
Figure 5:
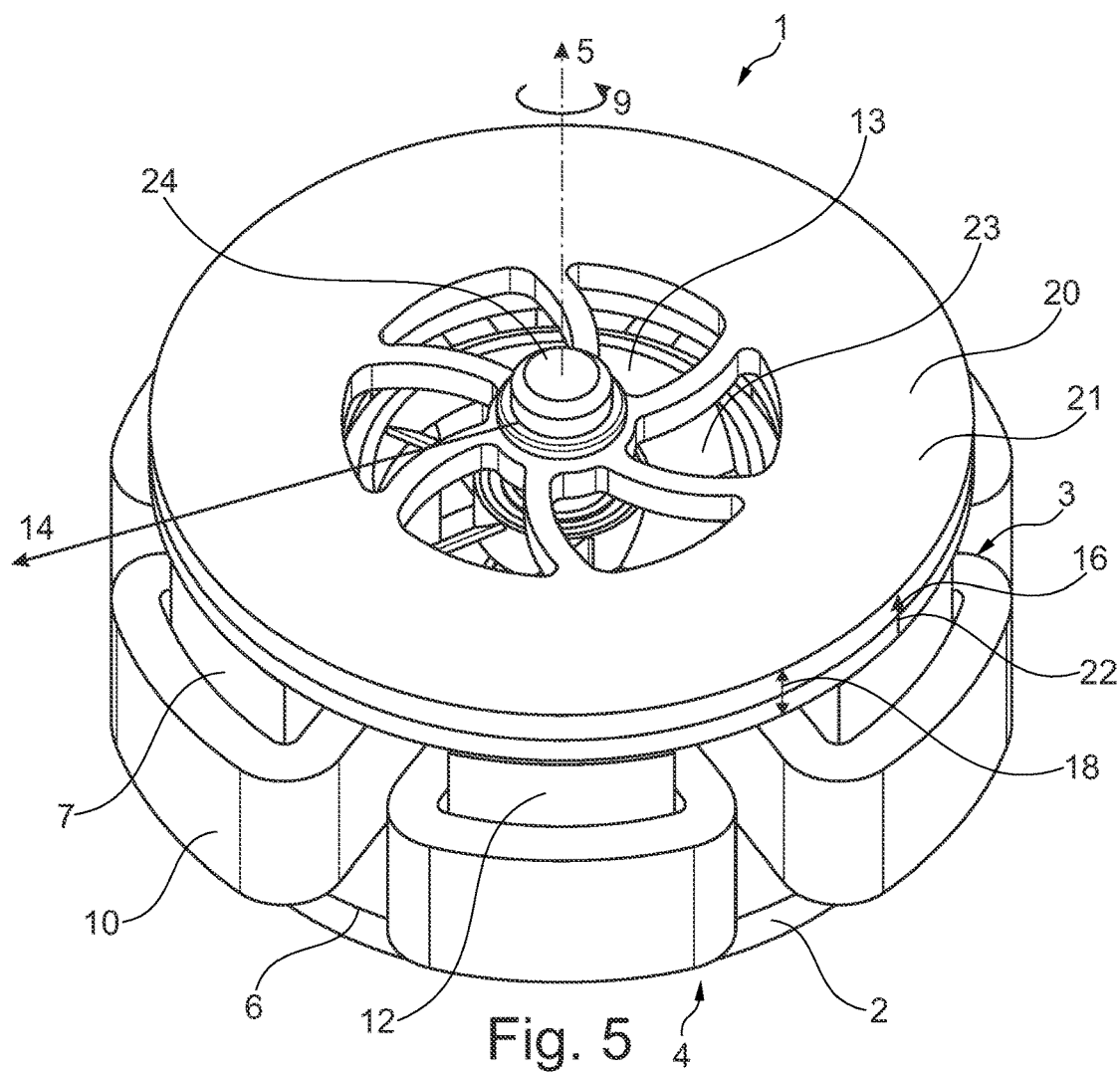
Figure 6:
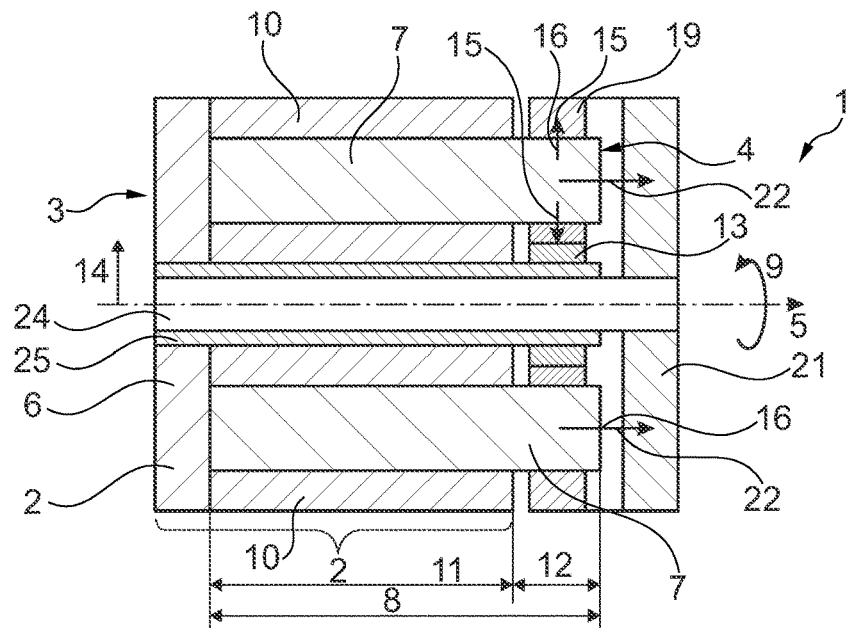

The invention, and the technical background, are explained in detail below with the aid of the drawings. It should be noted that the invention is not limited by the exemplary embodiments. In particular, unless explicitly stated elsewhere, it is also possible to extract sub-aspects of the content explained in the drawings and to combine them with other parts and insights from the present description and/or drawings. The same reference symbols relate to the same objects such that explanations from other drawings may be used in a supplementary fashion. In the drawings, schematically:

FIG. 1: shows a first alternative embodiment of an electric motor in a perspective view;

FIG. 2: shows the electric motor according to FIG. 1 in a perspective view;

FIG. 3: shows the electric motor according to FIGS. 1 and 2 in a side view;

FIG. 4: shows a second alternative embodiment of an electric motor in a perspective view;

FIG. 5: shows a third alternative embodiment of an electric motor in a perspective view; and FIG. 6: shows a fourth alternative embodiment of an electric motor in a side view.

FIG. 1 shows a first alternative embodiment of an electric motor in a perspective view. FIG. 2 shows the electric motor 1 according to FIG. 1 in a perspective view. FIG. 3 shows the electric motor 1 according to FIGS. 1 and 2 in a side view. FIGS. 1 to 3 are described jointly below.

The electric motor 1 has a stator 2 which extends between a first front side 3 and a second front side 4 in an axial direction 5 and has at the first front side 3 an annular yoke 6 and, starting from the yoke 6, a plurality of cores 7 which each extend in the axial direction 5 over a first length 8 as far as the second front side 4 and are arranged next to one another in the circumferential direction. A coil 10, which, starting from the yoke 6, extends in the axial direction 5 over a second length 11 as far as the second front side 4, is arranged at each core 7. The second length 11 is smaller than the first length 8 such that a section 12 of each core 7 extends in the axial direction 5 beyond the respective coil 10. The motor 1 additionally has a first rotor 13 and a second rotor 19 which are arranged at the second front side 4 and in each case in the axial direction 5 between the coils 10 and the second front side 4. When the motor 1 is operating, the first rotor 13 and the second rotor 19 use (essentially) a first component 15, oriented in a radial direction 14, of the magnetic flux 16 generated by the stator 2 in order to drive it.

A stator 2, which is constructed in the manner of an axial-flux motor, is combined with a first rotor 13 and a second rotor 19 which are each constructed and arranged in the manner of a radial-flux motor.

In an axial-flux motor, the stator 2 and the third rotor 21 (see FIGS. 5 and 6) are arranged next to each other in the axial direction 5, wherein the rotor 21 has poles 26 which are arranged opposite the coils 10 and cores 7 in the axial direction 5 and aligned with them in the axial direction 5 (on a same diameter).

In an axial-flux motor, essentially a second component 22, oriented in the axial direction 5, of the magnetic flux 16 generated by the stator 2 is used in order to drive the rotor 21.

In a radial-flux motor, the stator 2 and rotor 13, 19 are arranged next to each other in the radial direction 14, wherein the rotor 13, 19 has poles 26 which are arranged opposite the coils 10 and cores 7 in the radial direction 14 and possibly aligned with them at least in the radial direction 14 (on a same section 12 in the axial direction 5).

In a radial-flux motor, essentially a first component 15, oriented in the radial direction 14, of the magnetic flux 16 generated by the stator 2 is used in order to drive the rotor 13, 19.

When the motor 1 is operating, a drive force 17 acting between the stator 2 and the first rotor 13 and the second rotor 19 can be generated in a region 18 of the first rotor 13 and in a region 18 of the second rotor 19 which is arranged in each case in the radial direction 14 inside (second rotor 19) or outside (first rotor 13) the cores 7.

The first rotor 13 and the second rotor 19 are each designed such that the region 18 and the poles 26 of the rotor 13, 19 are arranged in the radial direction 14 in each case only inside or only outside the cores 7.

The motor 1 comprises the first rotor 13 and the second rotor 19, wherein the region 18 of the first rotor 13 is arranged in the radial direction 14 outside the cores 7, and the region 18 of the second rotor 19 is arranged in the radial direction 14 inside the cores 7.

The rotors 13, 19 here have the same number of poles, i.e. each rotor 13, 19 has twelve poles 26.

FIG. 4 shows a second alternative embodiment of an electric motor 1 in a perspective view. Reference is made to the explanations of FIGS. 1 to 3.

In contrast to the first alternative embodiment, the electric motor 1 according to the second alternative embodiment has only one rotor, namely a second rotor 19, wherein the region 18 of the second rotor 19 is arranged in the radial direction 14 inside the cores 7.

The second rotor 19 has a fluid-delivery geometry 23 for delivering a fluid, wherein the delivery of the fluid can be provided for the purpose of regulating the temperature of, for example, a different rotor. The fluid-delivery geometry 23 is configured in the manner of a pump such that the rotation of the second rotor 19 causes a movement of a fluid in a specified direction, here essentially the axial direction 5.

The second rotor 19 is arranged on a first shaft 24.

FIG. 5 shows a third alternative embodiment of an electric motor 1 in a perspective view. Reference is made to the explanations of FIG. 2.

In contrast to the second alternative embodiment, the motor 1 according to the third alternative embodiment has two rotors, namely a third rotor 21 in addition to the second rotor 19, the region 18 of which in the radial direction 14 is arranged inside the cores 7.

The motor 1 according to the third alternative embodiment comprises a rotor component 20 which forms the third rotor 21. The rotor component 20 is arranged next to the stator 2 in the axial direction 5. When the motor 1 is operating, the rotor component 20 uses a second component 22, oriented in the axial direction 5, of the magnetic flux 16 generated by the stator 2 in order to drive the rotor component 20.

This rotor component 20 is constructed in the manner of an axial-flux motor. In an axial-flux motor, the stator 2 and the rotor component 20 are arranged next to each other in the axial direction 5, wherein the rotor component 20 has poles 26 which are arranged opposite the coils 10 and cores 7 of the stator 2 in the axial direction 5 and possibly aligned in the axial direction 5 (i.e., for example, on a same diameter).

The rotor component 20 forms an independent third rotor 21 such that the motor 1 has the second rotor 19 and the third rotor 21.

The second rotor 19 comprises the fluid-delivery geometry 23 for the purpose of delivering a fluid, wherein the delivery of the fluid is provided for regulating the temperature of the third rotor 21.

FIG. 6 shows a fourth alternative embodiment of an electric motor 1 in a side view. Reference is made to the explanations of FIGS. 1 to 5.

The motor 1 comprises the first rotor 13 and the second rotor 19, wherein the region 18 of the first rotor 13 is arranged in the radial direction 14 outside the cores 7, and the region 18 of the second rotor is arranged in the radial direction 14 inside the cores 7. The first rotor 13 is connected non-rotatably to the first shaft 24.

The motor 1 additionally comprises a rotor component 20 which forms part of the second rotor 19. The rotor component 20 is arranged next to the stator 2 in the axial direction 5. When the motor 1 is operating, the rotor component 20 uses a second component 22, oriented in the axial direction 5, of the magnetic flux 16 generated by the stator 2 in order to drive the rotor component 20.

The second rotor 19 and the rotor component 20 are coupled to each other and connected non-rotatably to the second shaft 25 via the rotor component 20.

LIST OF REFERENCE NUMERALS 1 motor
2 stator
3 first front side
4 second front side
5 axial direction
6 yoke
7 core
8 first length
9 circumferential direction
10 coil
11 second length
12 section
13 first rotor
14 radial direction
15 first component
16 magnetic flux
17 drive force
18 region
19 second rotor
20 rotor component 21 third rotor
22 second component
23 fluid-delivery geometry
24 first shaft
25 second shaft
26 pole

The invention claimed is:

1. An electric motor comprising a stator which extends in an axial direction between a first front side and a second front side and has, at the first front side, an annular yoke and, starting from the yoke, a plurality of cores which each extend in the axial direction over a first length as far as the second front side and are arranged next to one another in a circumferential direction, wherein a coil, which, starting from the yoke, extends in the axial direction over a second length to the second front side, is arranged at each core, wherein the second length is smaller than the first length such that a section of each core extends in the axial direction beyond the respective coil, wherein the motor additionally comprises at least a first rotor which is arranged at least on the second front side in the axial direction between the coils and the second front side, wherein, when the motor is operating, the first rotor uses a first component oriented in a radial direction of the magnetic flux generated by the stator in order to drive it; wherein, when the motor is operating, a drive force acting between the stator and the first rotor is generated in a region of the first rotor which is arranged in the radial direction at least inside or outside the cores and wherein the electric motor at least comprises the first rotor and a second rotor, wherein the region of one rotor is arranged outside the cores in the radial direction and the region of the other rotor is arranged inside the cores in the radial direction.

2. The electric motor as claimed in claim 1, additionally comprising a rotor component which forms a third rotor or part of the first rotor or a second rotor, wherein the rotor component is arranged next to the stator in the axial direction, wherein, when the motor is operating, the rotor component uses a second component oriented in the axial direction of the magnetic flux generated by the stator in order to drive it.

3. The electric motor as claimed in claim 1, wherein the motor comprises at least two rotors, wherein the rotors have a different number of poles from each other such that the rotors are operable at least at a different speed or in a different direction of rotation.

4. The electric motor as claimed in claim 1, comprising at least two rotors, wherein at least one rotor has a first design for a synchronous machine and at least the other rotor has a second design for an asynchronous machine, wherein, when the motor is operating, a rotating field of the stator is oriented according to the rotor of the first design, and the rotor of the second design follows the rotating field with slip.

5. The electric motor as claimed in claim 1, comprising at least two rotors, wherein the rotors have different starting torques such that one rotor is operable at one speed, whilst the other rotor is stationary.

6. The electric motor as claimed in claim 1, comprising at least two rotors, wherein one rotor has a fluid-delivery geometry for delivering a fluid, wherein the delivery of the fluid is provided for regulating the temperature of the other rotor.

7. A method for operating the electric motor of claim 1, wherein the motor has a stator and at least two rotors, wherein one rotor has a first number of poles and the other rotor has a second number of poles, wherein the rotors are operated at least at a different speed or in a different direction of rotation.

8. A method for operating the electric motor of claim 1, wherein the motor has a stator and at least two rotors, wherein the rotors have different starting torques such that one rotor is operated at one speed, whilst the other rotor is stationary.

* * * * *